United States Patent Office 3,053,674
Patented Sept. 11, 1962

3,053,674
PORTLAND CEMENT CONCRETE ADJUVANT
Leo Liberthson and Milton H. Zara, New York, N.Y.,
assignors to Sonneborn Chemical and Refining Corporation, a corporation of Delaware
No Drawing. Filed June 9, 1960, Ser. No. 34,867
13 Claims. (Cl. 106—90)

This invention relates to a novel adjuvant for Portland cement concrete.

Portland cement concrete and Portland cement mortars, stuccos, and the like are among the most valuable and widely used building and construction materials. In practice, the concrete is made by mixing Portland cement with sand and mineral or other aggregates and water, to form a workable wet mass which is then poured or placed as desired and allowed to harden or set. The hardening or setting time is generally a function of many factors including ambient temperature, humidity, initial water content, type of cement used in the mix. The setting time decreases with increasing temperatures and increasing mix consistencies. After the concrete has reached its final set, its strength progressively increases as a function of time. The general practice in concrete construction is to specify a certain minimum compressive strength that the concrete should have after a given period of time, as for example, 28 days. This strength, such as the 28-day strength for any given concrete design generally varies in proportion to the so-called water/cement ratio specified for the design. Thus, as a general rule, sometimes referred to as "Abram's law," the lower the water/cement ratio of a given concrete mix, the greater will be the compressive strength after any given period of time. The consistency of the initial mix, of course, depends on the water content so that, expressed in another manner, the more water and the more fluid the initial mix contains, the lower will be the ultimate compressive strength after any given period of time. For purposes of compressive strength, therefore, it is desirable to maintain the water/cement ratio as low as is consonant with workability and/or flow. In terms of the latter, the conventional criterion is the so-called well known ASTM slump test. For a given concrete mix, the higher the slump, the lower the strength.

The slump test is conducted, i.e., by forming a cylinder or cone of the wet mix in a suitable container, inverting the same on a flat surface in the form of a mud-pie and measuring the degree of its decrease in height, or slump.

Once the concrete mix has started to set any "re-watering" or addition of more water to extend the time during which the mix can be worked or restored to workability, will generally very adversely affect the ultimate strength of the concrete.

In many instances, particularly in hot weather, it is desirable or even absolutely essential to prolong the setting time so as to allow the concrete to be poured or otherwise properly placed before the setting commences. In order to extend this setting time, i.e., decrease the rate at which the Portland cement gels or sets, materials which slow down the rate of hydration of the cement or which in some other manner modify the chemical reactions of the Portland cement have been used as "retarders." Examples of such "retarders" are sugar, sugar products, lignin sulfonates and inorganic materials such as gypsum or the like. But these retarders while slowing down the initial rate of setting of the concrete mix would often have other undesirable side effects and impart objectionable characteristics to the concrete. In fact, their use makes it mandatory to reduce water/cement ratio and slump in order to insure that the concrete will develop design strength.

Additives such as calcium chloride are known which accelerates the initial rate of development of the compressive strength of concrete so that, for example, normal 28-day strength is reached within a few days. These "accelerators," however, have the disadvantage that the use thereof is not followed by the normal, continuing increase in compressive strength as a function of time. As a rule the early strength resulting from their use falls off gradually with the ultimate, e.g., 28-day strength after lagging behind that of the reference concrete. In other words, while these accelerators would produce 28-day strength within a few days, the strength thereafter would actually be less than the strength of the concrete would have been if the accelerator had not been added.

One object of this invention is a novel adjuvant which may be added to the concrete or mortar mixes, or stucco mixes or the like (generically referred to as concrete herein), which will serve to initially retard the setting rate of the cement, but will thereafter act as an accelerator so that the initial rate of growth of the compressive strength will substantially increase and will exceed the normal 28-day value within a fraction of this time, and which will continue to grow as a function of time so that the compressive strength at any given period of time and the ultimate compressive strength will substantially exceed that of concrete without the adjuvant.

A further object of this invention is a concrete adjuvant which makes the compressive strength of the concrete, after any given period of time and the ultimate compressive strength substantially independent of the slump of the initial mixture. These and still further objects will become apparent from the following description:

The novel adjuvant in accordance with the invention comprises the reaction product obtained by heating an aqueous solution of zinc borate and gluconic acid.

The aqueous solution containing these reactants should have a concentration of between about 20–60% and preferably between about 25 and 35%. The zinc borate should be present in amount of about 0.1–0.5 part by weights per part by weight of the gluconic acid, and should preferably be present in amount of 0.3–0.5 part by weight per part by weight of the gluconic acid, and most preferably in an amount of about 0.5 part by weight per part by weight of the gluconic acid.

The gluconic acid may be used in any known or commercially available form as for example in either of its optically active forms or as mixture of these forms.

The zinc borate and the gluconic acid are preferably added to water in the amounts and proportions specified above and the water is heated to a temperature of at least 100 degrees F. until a clear solution is obtained indicating completion of the reaction and formation of the adjuvant in accordance with the invention.

The upper limit of temperature to which the heating is affected is not critical, and merely determined by practical consideration as when temperatures above 212 degrees F. are used, the water must be maintained under pressure to prevent its boiling off. Temperatures between about 180 and 200 degrees F. have proven most suitable. After the heating, the solution is preferably slowly cooled or allowed to slowly cool while stirring.

It is generally preferable to add the reactants in amount so that the aqueous solution formed is saturated with the reaction product, i.e., has a concentration of about 60%. After the formation, the solution may be subsequently diluted for use.

The clear solution obtained in accordance with the above may be used as such, i.e., in any concentration between about 20–60% and preferably between about 25–35% as the cement adjuvant.

The adjuvant may be added to the concrete mix at any time prior to its setting and is most preferably added to the mix during its conventional manufacture at the "ready-mix" plant. Amounts of .06–1.3% by weight and preferably .16–.32% by weight are added based on the Portland cement in the mixture.

In all other respects the concrete mixture is formed and used in the conventional manner as for example admixed with 2½ to 4 parts by weight of sand or other filler, per part by weight of cement and from about 4–8 and preferably about 5–7½ gallons of water per sack of cement.

With the use of the adjuvant in accordance with the invention, however, the water/cement ratio no longer is so critical with respect to the ultimate compressive strength obtained so that the mixture may be watered to the desired workable consistency. Even if over-watered so that the same would normally have to be discarded, the mix containing the adjuvant in accordance with the invention may be used and will produce structures with useful compressive strengths.

With the adjuvant in accordance with the invention, the mixture may have slumps between 2 and 8 inches, and preferably 3½ and 6 inches without a substantial variation in the compressive strength after any given period of time; or the ultimate compressive strength and within these ranges will have a higher compressive strength after a given period of time and a higher ultimate compressive strength than a corresponding concrete mix without the adjuvant in accordance with the invention and having the lowest workable slump.

The degree that the setting time of the concrete mix is increased by the use of the adjuvant in accordance with the invention depends upon the amount of adjuvant added and may be extended for a period measured in only minutes to a period of many hours or even days. With the use of the above-specified and preferable amounts of the adjuvants the setting time is generally increased about one to several hours.

The adjuvant in accordance with the invention may be used with cement in the amounts specified above with cement in any known or conventional mix, such as concrete, mortar or stucco which may contain any other additives such as air entraining agents, water-repellent materials, etc., conventially used in concrete.

Thus, the adjuvant in accordance with the invention may be used in concrete mixes in the manufacture of pre-stressed units, light-weight block, pavement construction, flooring, footings and retaining walls, concrete tanks, various mortars containing Portland cement, stucco containing Portland cement or any other known conventional building material having Portland cement as the hydraulic binder. The adjuvant in accordance with the invention will not affect the entrained air content of the concrete and as mentioned may be used with still other additives, it being preferable in this case to add each of the additives and adjuvant separately and incorporate the same into the mix prior to adding any further additive or the adjuvant in accordance with the invention.

In addition, to allowing the controlled retardation; causing an increase in the rate of strength growth and ultimate strength obtained and allowing the use of initial mixtures with the desired slump independent of the ultimate strength to be obtained, the adjuvant in accordance with the invention reduces plastic shrinkage, allows the production of structures with higher densities and greater impermeability and allows greater cement economy and workability.

The following examples are given by way of illustration and not limitation:

*Example 1*

336 gallons of water are heated to a temperature of 120 degrees F. in a stainless steel tank equipped with steam coils for heating, and a mechanical mixer.

800 lbs. of gluconic acid (100% gluconic acid basis) is added to the water while stirring and maintaining the temperature at 120 degrees F. until the gluconic acid is completely dissolved. The temperature of the solution is then raised to 180 degrees F. and 400 lbs. of zinc borate are added in 40 lb. increments and stirred after each addition until the total quantity has been added. The liquid is maintained at a temperature of 180 degrees F. for a period of one-half hour during which time a completely clear solution is formed. The solution is then cooled to 100 degrees F. at a rate of 2 degrees per minute by introducing water into the steam coils. The rate of cooling should be a slow enough rate to prevent precipitation, but if precipitation does occur, it is merely necessary to reheat the solution until clear and then proceed with the cooling. After cooling and forming a clear solution, the batch is diluted with warm water to form a 30% aqueous solution.

*Example 2*

.5 part by weight of zinc borate per part by weight of gluconic acid are introduced into water in an autoclave provided with heating and cooling coils and a mechanical agitator so that a 60% solution of the reactants is formed. The solution is heated to a temperature of 180 degrees F. under a pressure between 9 and 10 atmospheres while stirring. After about 10–15 minutes a completely clear solution is formed which is allowed to gradually cool while stirring to 120 degrees F. and the pressure is slowly relieved. While the solution is maintained at 120 degrees F., further water is added to form a 30% solution which is then allowed to cool to room temperature.

*Example 3*

A batch of concrete consisting of 483 lbs. of type I Portland cement, 1,460 lbs. of sand, having a fineness modulus of 2.3, and 1,730 lbs. of crushed rock having a maximum size of 1½" was gauged with 32.5 gallons of water containing 10 oz. of the solution obtained in Example 1. After mixing in a conventional concrete mixer, the slump of the mix was tested and found to be 3". As the concrete was poured to form a poured concrete structure, test cylinders were drawn from the batch. Tests indicated a 28-day compressive strength of 3,900 lbs. p.s.i.

*Example 4*

A concrete mixture having the identical composition to that formed in Example 3 was made up except that additional water was added to produce a 5" slump. The 28-day compressive strength of this mixture was substantially identical to that in Example 3.

*Example 5*

A concrete mixture formed exactly as that of Example 4, except without the addition of the adjuvant in accordance with the invention, showed a 28-day compressive strength of only 3,300 lbs. p.s.i.

*Example 6*

A batch of concrete consisting of 400 lbs. of cement, 1,318 lbs. of fine aggregate, 1,800 lbs. of coarse aggregate was gauged with water containing 14 oz. of the solution formed in Example 2 so as to form a concrete mix having a 3½" slump. The 7-day compressive strength was 2,045 lbs. p.s.i. When additional gauging water was added to produce a slump of 7", the 7-day compressive strength remained substantially identical. A reference concrete without the adjuvant in accordance with the invention and designed to produce 2,500 lbs. compressive strength in 28 days only showed a 1,600 p.s.i. compressive strength after 7 days.

*Example 7*

The mix of Example 6 containing the adjuvant in accordance with the invention, upon being "over-watered" to produce a slump beyond measurement so that the same would normally be discarded still showed a useful compressive strength of 7 days of 1,400 p.s.i.

Example 8

A concrete mix consisting of 400 lbs. of Portland cement, 1,318 lbs. of fine aggregate and 1,800 lbs. of coarse aggregate was gauged with water containing 9 oz. of the solution of Example 1 to a slump of 3½". The 7-day compressive strength of cylinders taken from this mix was 2,045 lbs. p.s.i. (28-day compressive strength was 2,800 p.s.i.). When additional water was incorporated to yield a slump of 7", the compressive strength after 7 days was 1,965 lbs. p.s.i. 28 day compressive strength was 2,795 p.s.i.

Example 9

A motar mix consisting of 1 sack (94 lbs.) of Portland cement to 4 parts by volume of sand was gauged with water containing 2 fluid ounces of the solution of Example 1 to an ASTM flow of 105%. The 7-day compressive strength of 2" x 2" cubes taken from this mix was 2,150 p.s.i. 28-day compressive strength was 3,080 p.s.i. When additional water was incorporated to yield a flow of 120% the compressive strength after 7 days was 2,200 p.s.i., and after 28 days 3,190 p.s.i. A similar mix without solution in Example 1 taken to a flow of 103% produced a compressive strength after 7 days of 1,770 p.s.i. and after 28 days, 2,740 p.s.i. under similar conditions.

Example 10

Determinations of initial setting time were made on the mix described in Example 9 at a temperautre of 70 degrees F. The following table illustrates the retardations observed as a function of the dosage of adjuvant:

| Rate of Addition of Adjuvant per Sack of Cement | Initial Setting Time in Minutes Reference: 120 min. |
|---|---|
| 2 fluid ounces | 140 |
| 3 fluid ounces | 156 |
| 4 fluid ounces | 168 |

We claim:

1. The reaction product obtained by heating 0.1–1.0 part by weight of zinc borate per part by weight of gluconic acid in an aqueous solution.
2. The reaction product obtained by heating 0.3–0.5 part by weight of zinc borate per part by weight of gluconic acid in an aqueous solution.
3. The reaction product obtained by heating 0.5 part by weight of zinc borate per part by weight of gluconic acid, in an aqueous solution.
4. A 20–60% aqueous solution of the reaction product obtained by heating 0.1–1.0 part by weight zinc borate per part by weight of gluconic acid.
5. A 25–35% aqueous solution of the reaction product obtained by heating 0.1–1.0 part by weight zinc borate per part by weight of a gluconic acid solution.
6. A 25–35% aqueous solution of the reaction product obtained by heating 0.3–0.5 part by weight of zinc borate per part by weight of gluconic acid in an aqueous solution.
7. Process for the production of a concrete adjuvant which comprises heating 0.1–1.0 part by weight of zinc borate per part by weight of gluconic acid in an aqueous solution to temperatures of at least 110 degree F. and recovering the clear solution formed with about a 20–60% concentration.
8. Process according to claim 7 which said heating is effected at a temperature between about 180 and 200 degrees F.
9. Process according to claim 8 in which the solution contains 0.3–0.5 part by weight of zinc borate per part by weight of gluconic acid.
10. In the method of making Portland cement containing structures in which the Portland cement is admixed with an aggregate and water and the mixture allowed to set, the improvement which comprises adding .06–1.3% by weight of a 20–60% aqueous solution of the reaction product obtained by heating 0.1–1.0 part by weight of zinc borate per part by weight of gluconic acid, based on the Portland cement, to the mixture prior to setting.
11. Improvement according to claim 10 in which said aqueous solution is a 25–35% aqueous solution.
12. Improvement according to claim 11 in which said addition is made with .16–.32% by weight based on the Portland cement.
13. Improvement according to claim 12 in which said reaction product is of 0.3–0.5 part by weight of zinc borate per part by weight of gluconic acid.

References Cited in the file of this patent

UNITED STATES PATENTS

| | | |
|---|---|---|
| 1,893,872 | Schmidt et al. | Jan. 10, 1933 |
| 2,537,032 | Chester | Jan. 9, 1951 |
| 2,701,811 | Chester | Feb. 8, 1955 |
| 2,819,171 | Scripture | Jan. 7, 1958 |
| 2,936,242 | Brauer | May 10, 1960 |